United States Patent
Fanfelle

(10) Patent No.: US 10,356,632 B2
(45) Date of Patent: Jul. 16, 2019

(54) VARIABLE BEAMWIDTH MULTIBAND ANTENNA

(71) Applicant: Cohere Technologies, Inc., Santa Clara, CA (US)

(72) Inventor: Robert Fanfelle, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/881,752

(22) Filed: Jan. 27, 2018

(65) Prior Publication Data

US 2018/0302802 A1    Oct. 18, 2018

Related U.S. Application Data

(60) Provisional application No. 62/451,547, filed on Jan. 27, 2017.

(51) Int. Cl.
| | |
|---|---|
| *H04W 16/28* | (2009.01) |
| *H01Q 5/50* | (2015.01) |
| *H01Q 1/24* | (2006.01) |
| *H04W 72/04* | (2009.01) |
| *H01Q 21/24* | (2006.01) |

(Continued)

(52) U.S. Cl.
CPC .......... *H04W 16/28* (2013.01); *H01Q 1/246* (2013.01); *H01Q 3/245* (2013.01); *H01Q 5/45* (2015.01); *H01Q 5/50* (2015.01); *H01Q 15/02* (2013.01); *H01Q 19/062* (2013.01); *H01Q 21/0006* (2013.01); *H01Q 21/24* (2013.01); *H01Q 25/007* (2013.01); *H04B 7/0617* (2013.01); *H04W 72/0453* (2013.01); *H01Q 15/08* (2013.01); *H01Q 21/06* (2013.01); *H04B 7/00* (2013.01)

(58) Field of Classification Search
CPC .... H04W 16/28; H04W 72/0453; H01Q 5/50; H01Q 1/246; H01Q 15/02; H01Q 21/24; H01Q 5/335; H01Q 16/062
USPC .............................. 455/562.1; 343/751, 755
See application file for complete search history.

(56) References Cited

U.S. PATENT DOCUMENTS

| | | | |
|---|---|---|---|
| 4,626,858 A | * | 12/1986 | Copeland ............ H01Q 25/002 342/363 |
| 4,754,493 A | | 6/1988 | Coates |

(Continued)

FOREIGN PATENT DOCUMENTS

| | | |
|---|---|---|
| CN | 1235720 A | 11/1999 |
| CN | 101682316 A | 3/2010 |

(Continued)

OTHER PUBLICATIONS

International Search Report and Written Opinion for International Application No. PCT/US2017/025797, dated Jun. 21, 2017, 6 pages.

(Continued)

*Primary Examiner* — Hai V Nguyen
(74) *Attorney, Agent, or Firm* — Perkins Coie LLP

(57) ABSTRACT

An antenna system includes an antenna lens, and one or more antenna feeds placed at an on or off-focal point of the antenna lens. Each of the one or more antenna feeds comprises one or more antenna feed elements that are electrically independently operable. The antenna system also includes an antenna feed network electrically coupled with the one or more antenna feed elements via signal paths.

13 Claims, 12 Drawing Sheets

(51) Int. Cl.
*H01Q 15/02* (2006.01)
*H01Q 3/24* (2006.01)
*H01Q 19/06* (2006.01)
*H01Q 21/00* (2006.01)
*H01Q 25/00* (2006.01)
*H01Q 5/45* (2015.01)
*H04B 7/06* (2006.01)
*H01Q 15/08* (2006.01)
*H01Q 21/06* (2006.01)
*H04B 7/00* (2006.01)

(56) References Cited

U.S. PATENT DOCUMENTS

| | | | |
|---|---|---|---|
| 4,769,646 A * | 9/1988 | Raber | H01Q 19/06 343/753 |
| 5,083,135 A | 1/1992 | Nagy et al. | |
| 5,182,642 A | 1/1993 | Gersdorff et al. | |
| 5,398,035 A * | 3/1995 | Densmore | H01Q 1/3275 343/713 |
| 5,623,511 A | 4/1997 | Bar-David et al. | |
| 5,666,126 A * | 9/1997 | Lange | H01Q 1/247 343/781 R |
| 5,831,977 A | 11/1998 | Dent | |
| 5,872,542 A | 2/1999 | Simons et al. | |
| 5,956,624 A | 9/1999 | Hunsinger et al. | |
| 6,212,246 B1 | 4/2001 | Hendrickson | |
| RE37,218 E * | 6/2001 | Densmore | H01Q 1/3275 343/713 |
| 6,289,063 B1 | 9/2001 | Duxbury | |
| 6,356,555 B1 | 3/2002 | Rakib et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Combes et al. | |
| 6,956,814 B1 | 10/2005 | Campanella | |
| 7,010,048 B1 | 3/2006 | Shattil | |
| 7,030,831 B2 * | 4/2006 | Nilsson | H01Q 1/242 343/789 |
| 7,034,771 B2 * | 4/2006 | Rao | H01Q 19/17 343/781 R |
| 7,327,812 B2 | 2/2008 | Auer | |
| 7,392,018 B1 | 6/2008 | Ebert et al. | |
| 7,394,436 B2 * | 7/2008 | Rao | H01Q 19/17 343/780 |
| 7,577,398 B2 * | 8/2009 | Judd | G01S 19/25 342/357.48 |
| 7,689,049 B2 | 3/2010 | Monro | |
| 7,773,685 B2 | 8/2010 | Tirkkonen et al. | |
| 7,864,877 B2 | 1/2011 | Hottinen | |
| 7,868,840 B2 * | 1/2011 | Rao | H01Q 19/17 343/772 |
| 8,229,017 B1 | 7/2012 | Lee et al. | |
| 8,259,845 B2 | 9/2012 | Dent | |
| 8,358,249 B2 * | 1/2013 | Toso | H01Q 3/46 343/753 |
| 8,401,131 B2 | 3/2013 | Fety et al. | |
| 8,547,988 B2 | 10/2013 | Hadani et al. | |
| 8,619,892 B2 | 12/2013 | Vetter et al. | |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 | 7/2015 | Rakib et al. | |
| 9,083,595 B2 | 7/2015 | Rakib et al. | |
| 9,130,638 B2 | 9/2015 | Hadani et al. | |
| 9,282,528 B2 | 3/2016 | Hashimoto | |
| 9,294,315 B2 | 3/2016 | Hadani et al. | |
| 9,444,514 B2 | 9/2016 | Hadani et al. | |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 | 4/2017 | Rakib et al. | |
| 9,660,851 B2 | 5/2017 | Hadani et al. | |
| 9,668,148 B2 | 5/2017 | Hadani et al. | |
| 9,712,354 B2 | 7/2017 | Hadani et al. | |
| 9,729,281 B2 | 8/2017 | Hadani et al. | |
| 9,819,094 B2 * | 11/2017 | Matitsine | H01Q 19/06 |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0164920 A1 * | 8/2004 | Nilsson | H01Q 1/242 343/840 |
| 2004/0174812 A1 | 9/2004 | Murakami et al. | |
| 2004/0189581 A1 | 9/2004 | Sako et al. | |
| 2004/0218523 A1 | 11/2004 | Varshney et al. | |
| 2005/0052333 A1 * | 3/2005 | Rao | H01Q 19/17 343/840 |
| 2005/0157778 A1 | 7/2005 | Trachewsket et al. | |
| 2005/0157820 A1 | 7/2005 | Wongwirawat et al. | |
| 2005/0180517 A1 | 8/2005 | Abe | |
| 2005/0207334 A1 | 9/2005 | Hadad | |
| 2005/0251844 A1 | 11/2005 | Marione et al. | |
| 2006/0008021 A1 | 1/2006 | Bonnet | |
| 2006/0039270 A1 | 2/2006 | Strohmer et al. | |
| 2007/0014272 A1 | 1/2007 | Palanki et al. | |
| 2007/0018900 A1 * | 1/2007 | Rao | H01Q 19/17 343/779 |
| 2007/0038691 A1 | 2/2007 | Candes et al. | |
| 2007/0078661 A1 | 4/2007 | Sriram | |
| 2007/0104283 A1 | 5/2007 | Han et al. | |
| 2007/0110131 A1 | 5/2007 | Guess et al. | |
| 2007/0132651 A1 * | 6/2007 | Nilsson | H01Q 1/242 343/781 P |
| 2007/0211952 A1 | 9/2007 | Faber et al. | |
| 2007/0237181 A1 | 10/2007 | Cho et al. | |
| 2007/0253465 A1 | 11/2007 | Muharemovic et al. | |
| 2007/0253504 A1 | 11/2007 | Hasegawa | |
| 2008/0043857 A1 | 2/2008 | Dias et al. | |
| 2008/0117999 A1 | 5/2008 | Kadous et al. | |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0278397 A1 * | 11/2008 | Rao | H01Q 19/17 343/779 |
| 2008/0310383 A1 | 12/2008 | Kowalski | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0204627 A1 | 8/2009 | Hadani | |
| 2009/0222226 A1 | 9/2009 | Baraniuk et al. | |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |
| 2010/0111138 A1 | 5/2010 | Hosur et al. | |
| 2010/0142476 A1 | 6/2010 | Jiang et al. | |
| 2010/0187914 A1 | 7/2010 | Rada et al. | |
| 2010/0205637 A1 * | 8/2010 | Vanduyn | H04N 5/44543 725/47 |
| 2010/0207833 A1 * | 8/2010 | Toso | H01Q 3/46 343/754 |
| 2010/0238787 A1 | 9/2010 | Guey | |
| 2010/0277308 A1 | 11/2010 | Potkonjak | |
| 2010/0303136 A1 | 12/2010 | Ashikhmin et al. | |
| 2010/0322349 A1 | 12/2010 | Lee et al. | |
| 2011/0007789 A1 | 1/2011 | Garmany | |
| 2011/0110532 A1 | 5/2011 | Svendsen | |

(56) References Cited

U.S. PATENT DOCUMENTS

| | | |
|---|---|---|
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0087284 A1* | 4/2012 | Linehan .......... H01Q 1/246 370/297 |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0091767 A1* | 4/2015 | Matitsine .......... H01Q 19/06 343/755 |
| 2015/0102973 A1* | 4/2015 | Hand .......... H01Q 1/38 343/836 |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0347145 A1* | 11/2017 | Coburn .......... H04N 21/4314 |

FOREIGN PATENT DOCUMENTS

| | | |
|---|---|---|
| CN | 101939935 A | 1/2011 |
| EP | 0868082 A2 | 9/1998 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 4, 2016, 13 pages.

Office Action for U.S. Appl. No. 15/152,464, dated Apr. 6, 2017, 10 pages.

Examination Report No. 1 for Australian Application No. 2013280487, dated May 2, 2016, 3 pages.

International Search Report and Written Opinion for International Application No. PCT/US2016/031928, dated Oct. 7, 2016, 10 pages.

Office Action for U.S. Appl. No. 15/188,946, dated May 8, 2017, 14 pages.

International Search Report and Written Opinion for International Application No. PCT/US2016/038584, dated Sep. 26, 2016, 8 pages.

Office Action for U.S. Appl. No. 15/187,668, dated Feb. 16, 2017, 6 pages.

International Search Report and Written Opinion for International Application No. PCT/US2016/031909, dated Aug. 11, 2016, 13 pages.

Office Action for U.S. Appl. No. 15/194,494, dated May 5, 2017, 16 pages.

International Search Report and Written Opinion for International Application No. PCT/US2016/039662, dated Nov. 29, 2016, 14 pages.

Office Action for U.S. Appl. No. 15/436,653, dated Jun. 2, 2017, 10 pages.

Office Action for U.S. Appl. No. 15/208,545, dated Aug. 21, 2017, 15 pages.

International Search Report and Written Opinion for International Application No. PCT/US2016/041940, dated Oct. 20, 2016, 8 pages.

Supplementary European Search Report for European Application No. 13768150.8, dated Oct. 30, 2015, 7 pages.

International Search Report and Written Opinion for International Application No. PCT/US2013/033652, dated Jun. 12, 2013, 8 pages.

International Search Report and Written Opinion for International Application No. PCT/US2015/041417, dated Oct. 1, 2015, 7 pages.

Office Action for U.S. Appl. No. 14/805,407, dated Dec. 14, 2016, 7 pages.

International Search Report and Written Opinion for International Application No. PCT/US2015/041420, dated Oct. 1, 2015, 6 pages.

International Search Report and Written Opinion for PCT Application No. PCT/US2018/015618, dated May 16, 2018, 8 pages.

Office Action for U.S. Appl. No. 13/117,119, dated Aug. 5, 2013, 5 pages.

(56) References Cited

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, datd Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pges.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

* cited by examiner $$\varepsilon_r = 2 - (r/a)^2$$

where r is the distance from the center of the lens to an interior point, a is the outer radius of the lens and $\varepsilon_r$ is the relative dielectric constant at r.

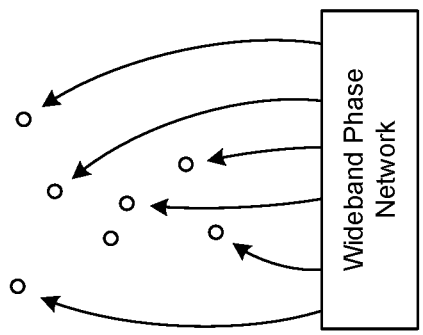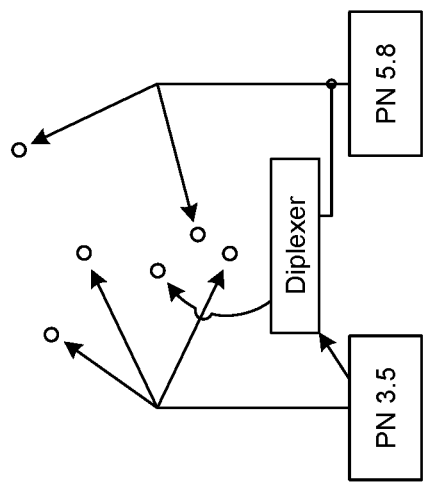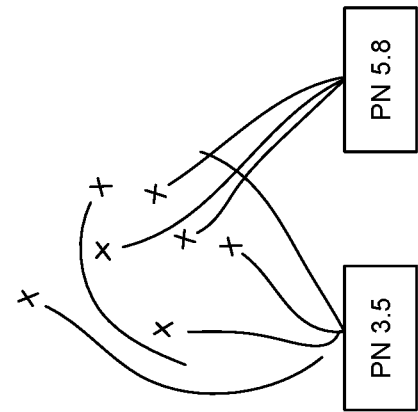
FIG. 5B

VARIABLE BEAMWIDTH MULTIBAND ANTENNA

CROSS REFERENCE TO RELATED APPLICATIONS

This patent document claims benefit and priority of U.S. Provisional Patent Application No. 62/451,547 entitled "VARIABLE BEAMWIDTH MULTIBAND ANTENNA", filed on Jan. 27, 2017. The entire content of the aforementioned patent application is incorporated by reference as part of the disclosure of this patent document.

TECHNICAL FIELD

The present document relates to wireless communication, and more particularly, to antenna designs for transmission and reception of wireless signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses antennas that can be deployed in wireless networks to provide efficient, multiband signal coverage.

In one example aspect, a transmit antenna configuration is disclosed. The antenna configuration comprises one or more antenna feeds, with each antenna feed comprising one or more antenna feed elements that are electrically independently operable. The one or more antenna feeds are positioned in an on or off-focal point of a lens antenna. The antenna configuration also includes an antenna feed arrangement that provides transmission signals to the antenna elements. A corresponding receive antenna configuration can be realized in a similar manner; all further mentions of transmit aspects also imply that a similar receive case feature as well. Similarly, in those cases where an explanation is based on the receive case, it is implied that an equivalent transmit configuration/interpretation exists.

In another example aspect, a method of operating a wireless transmission station is disclosed. The method includes arranging a number of antenna feeds in an antenna array on or near the surface of a Luneburg Lens, the antenna array extending along an azimuth axis and an elevation axis. The method further includes operating antenna feeds comprised of multiple antenna elements, each element sensitive to a range of frequencies. The wireless transmission station may further include a dynamic weighted magnitude and phase shifting network, comprised of analog and/or digital components, which process one or more communication signals and provide the signals to antenna array elements and antenna feeds, to modify the effective beam width of the transmitted/received signals. One embodiment will generate shaped transmission beams using two or more antenna feeds and/or antenna elements in antenna feeds for signal transmission such that an approximately equal-density signal coverage is provided to geographic areas irrespective of their distance from the wireless transmission station.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 5B shows example feed element configurations in a wideband antenna.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. Unless otherwise noted, abbreviations used in the present document are consistent with generally well-known 3GPP terminology. For the ease of explanation, many techniques and structures are described in the context of signal transmissions. However, using duality of transmission/reception, similar features are also applicable for signal reception techniques.

Figure 1A:
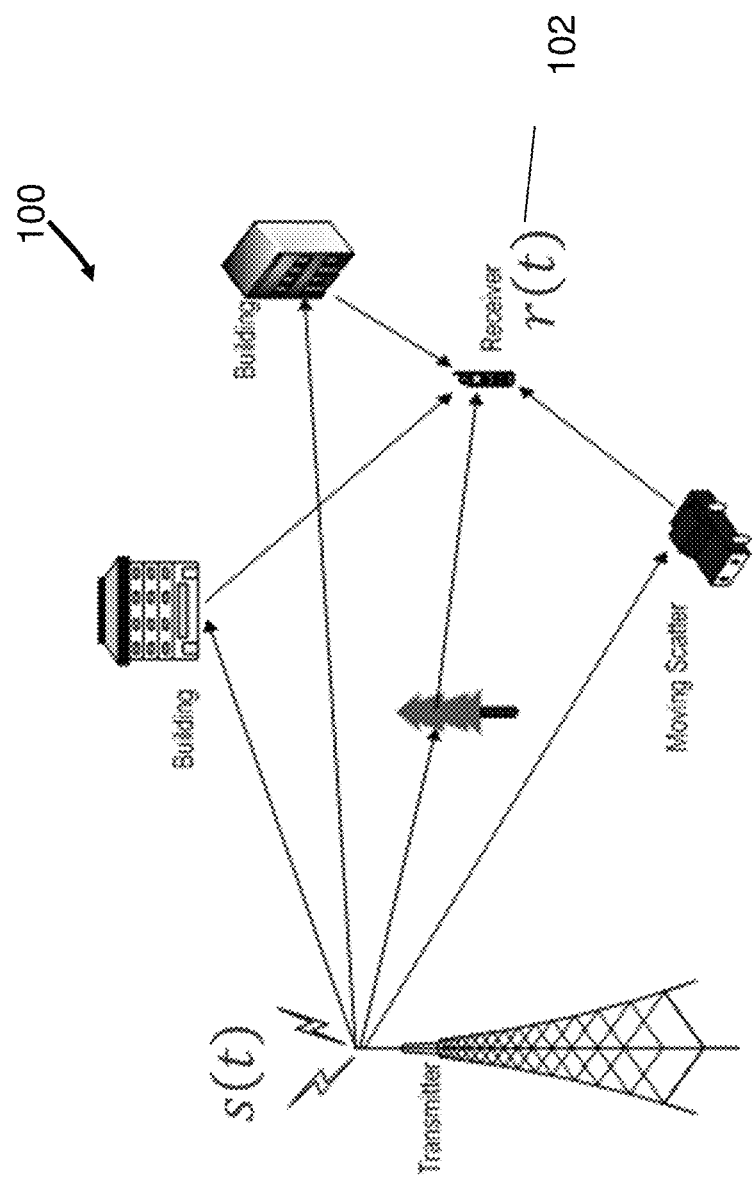
FIG. 1A shows an example communication network.

FIG. 1A shows an example communication network 100 in which the disclosed technologies can be implemented. The network 100 may include a base station that, in the downlink, transmits wireless signals s(t) (downlink signals) to one or more UEs (user equipment, which may be mobile stations, customer premises equipment, etc.) acting as receivers 102, the received signal being denoted as r(t), where the UEs may be located in a variety of locations, including inside or outside a building or in a moving vehicle. The UEs may transmit uplink transmissions to the base station. The technology described herein may be implemented at a UE 102 or at the a base station. In the case of a fixed wireless transmission system, the UE 102 may be relatively static. For example, the receiver 102 may be affixed to an outside wall or roof of the building (not shown in FIG. 1A). In the case of high-altitude platforms, the base station may be mounted on a balloon, drone, or similar device. The technology may also be implemented on devices used for device-to-device communications, including nodes in mesh networks.

Figure 1B:
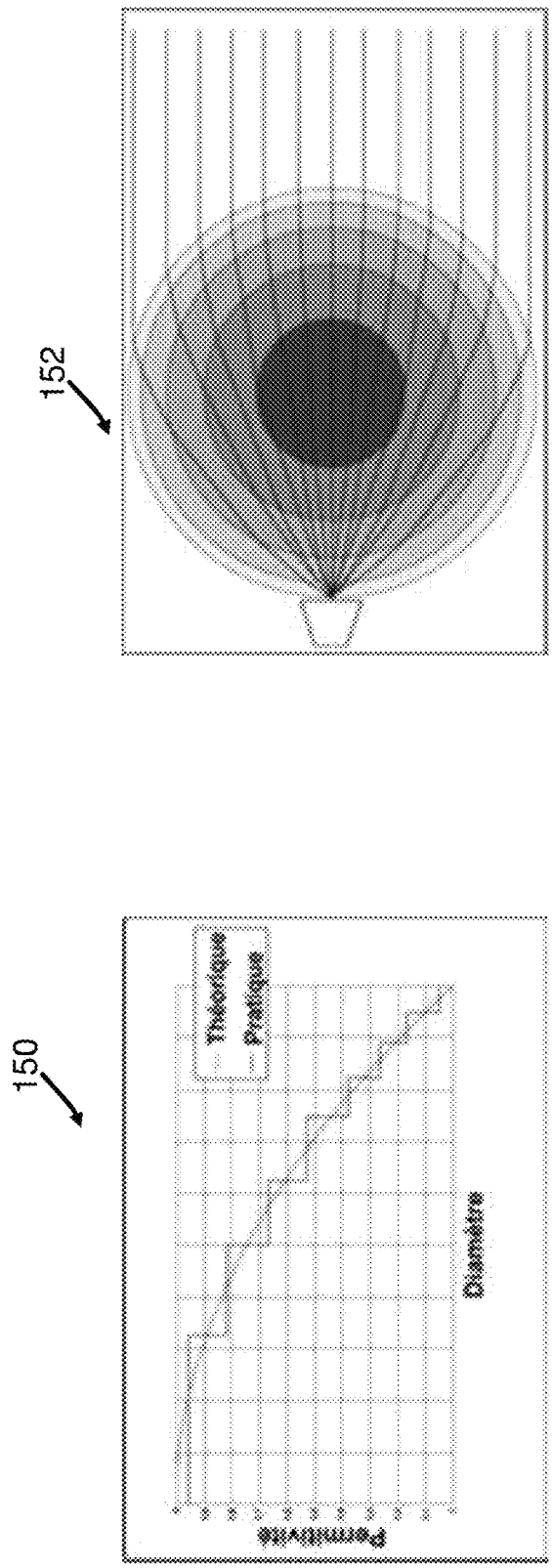
FIG. 1B shows an example of a lens antenna configuration.

FIG. 1B shows an example of a lens antenna. As depicted in the ray drawing on the right (152), in a traditional lens antenna, an antenna feed is placed at the focal point of the lens antenna such that signals transmitted from the antenna feed are sent into the direction of the associated beam. The graph 150 shows an example of permittivity of the antenna material as a function of distance from the center of the sphere to achieve the focal concentration effect. Two curves are shown—the smooth curve is the theoretical permittivity, which varies continuously and smoothly throughout the breadth of the lens, while the step-wise curve represents a practical implementation in which permittivity is a step function. Such a practical implementation may be achieved by layering together several concentric spherical pieces with variable dielectric properties. The block diagram 152 shows convergence of signal beams as they travel through the antenna lens from air (right hand side) to the focal point, where an antenna feed is shown to be located.

The relative dielectric constant at distance r from the center of the lens to an interior point is given by the equation: $\varepsilon_r = 2 - (r/a)^2$, where a is the outer radius of the lens.

Figure 2:
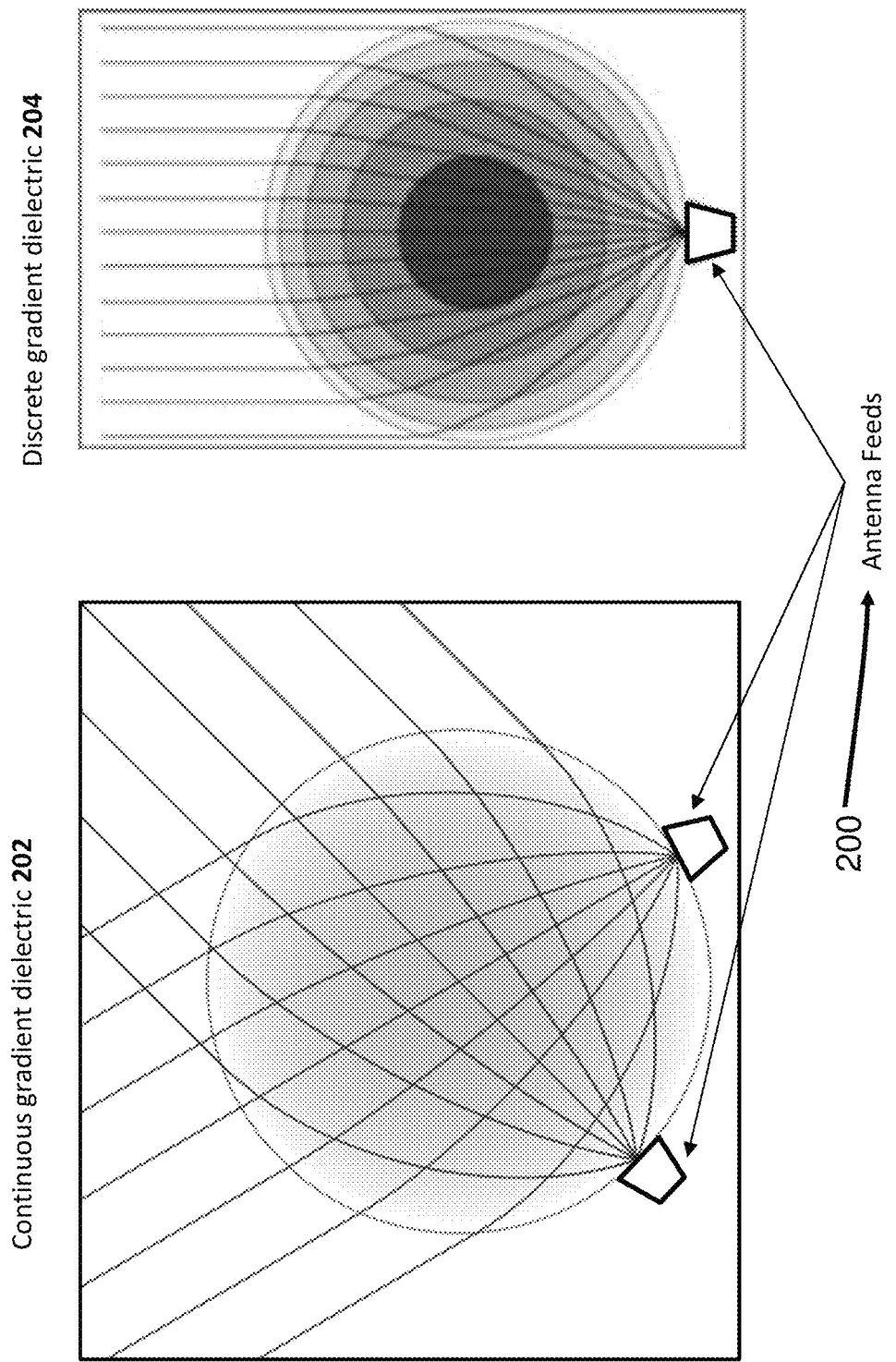
FIG. 2 shows example antenna configurations for beamforming.

FIG. 2 shows additional examples of antenna designs to achieve the beamforming. In embodiment 202, dielectric constant of the lens material is continuously varied to achieve the desired focal point of convergence (e.g., similar to the smooth curve in graph 150). As depicted, multiple antenna feeds 200 may be placed at multiple locations around the spherical lens, thereby resulting in the antenna being able to transmit multiple signal beams in different spatial directions.

In embodiment 204, discrete material layers may be used, each layer having a different dielectric constant, to achieve focus of radiated or received wireless signals in a particular direction. While only one antenna feed is shown in embodiment 204, in general, multiple antenna feeds may be used to enable transmission of multiple beams.

Figure 3:
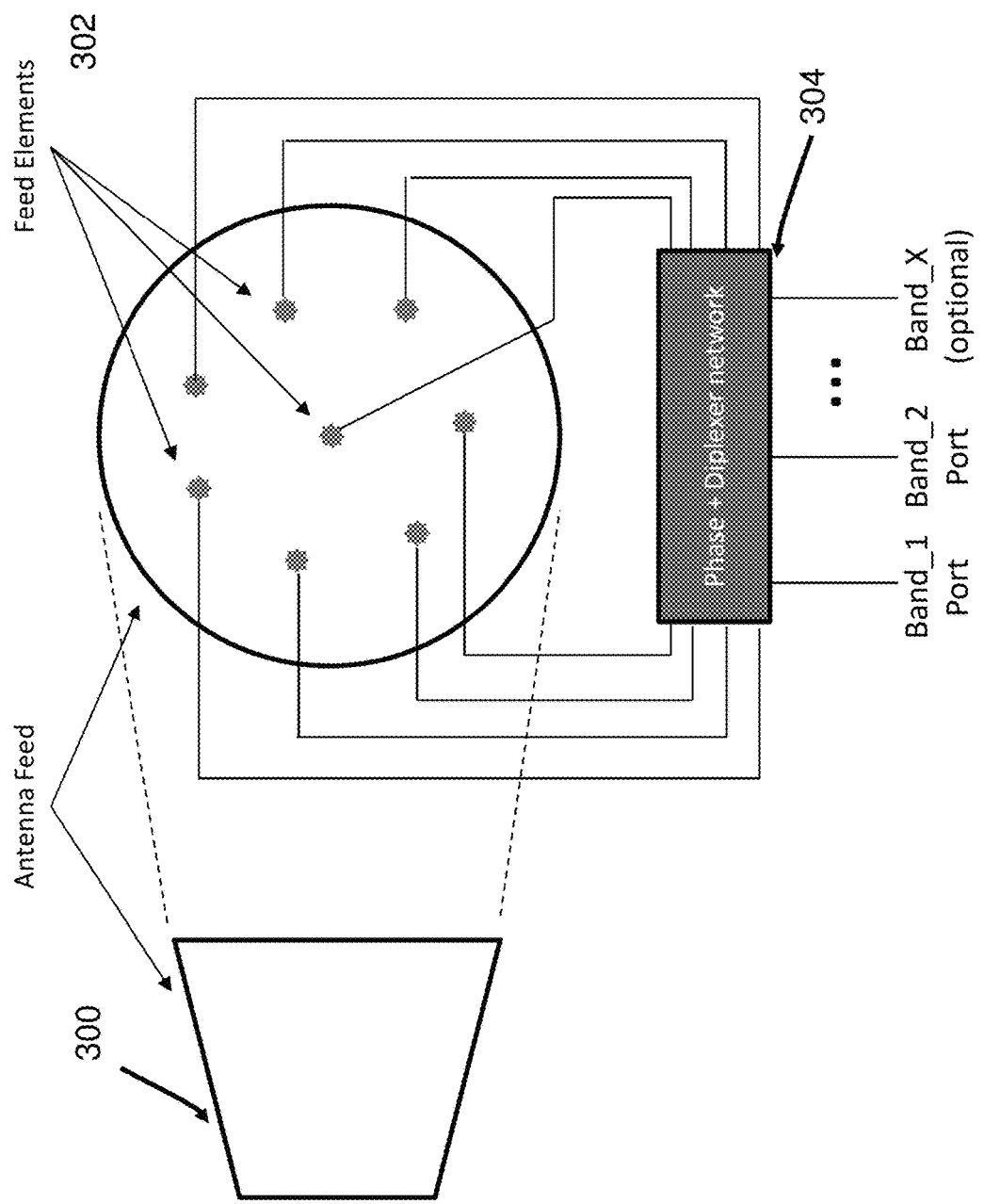
FIG. 3 shows an example of an antenna configuration in which multiple antenna elements are used for multiple frequency bands.

FIG. 3 shows an example configuration of an antenna feed 300 in which multiple antenna feed elements 302 are used for transmitting/receiving signals. The antenna feed elements 302 may be used in various configurations, as described herein.

The multiple antenna feed elements 302 may be driven by a phased network that provides (or receives) the corresponding signals to the antenna feed elements 302. For example, in some embodiments, an antenna feed 300 may operate to transmit or receive wireless signals in multiple frequency bands. Without loss of generality and only for illustrative purpose, the multi-band embodiments are described with reference to two frequency bands—a 3.5 GHz frequency band (e.g., between 2.5 and 3.5 GHz or between 3.55 and 3.7 GHz) and a 5.8 GHz frequency band (e.g., frequencies between 5.1 and 5.9 GHz) for multiple frequency bands. However, it is understood that the disclosed techniques can be used for multiple (greater than two) frequency bands at different operational frequencies.

The antenna feed 300 is made up of separate antenna feed elements 302, each of which may have its own electrical connection with a feeder network 304 that may include a phase adjustment circuit and/or a diplexer. In one example use case, each antenna element may be used for transmission/reception of a single frequency band, with the feeder network 304 performing the selectivity of which antenna element to map to which frequency band. In the depicted example, signals for transmission/reception within bands 1 to X (where X is an integer) may be fed into the phase+ diplexer network, separated and fed into the antenna feed elements 302.

Figure 4:
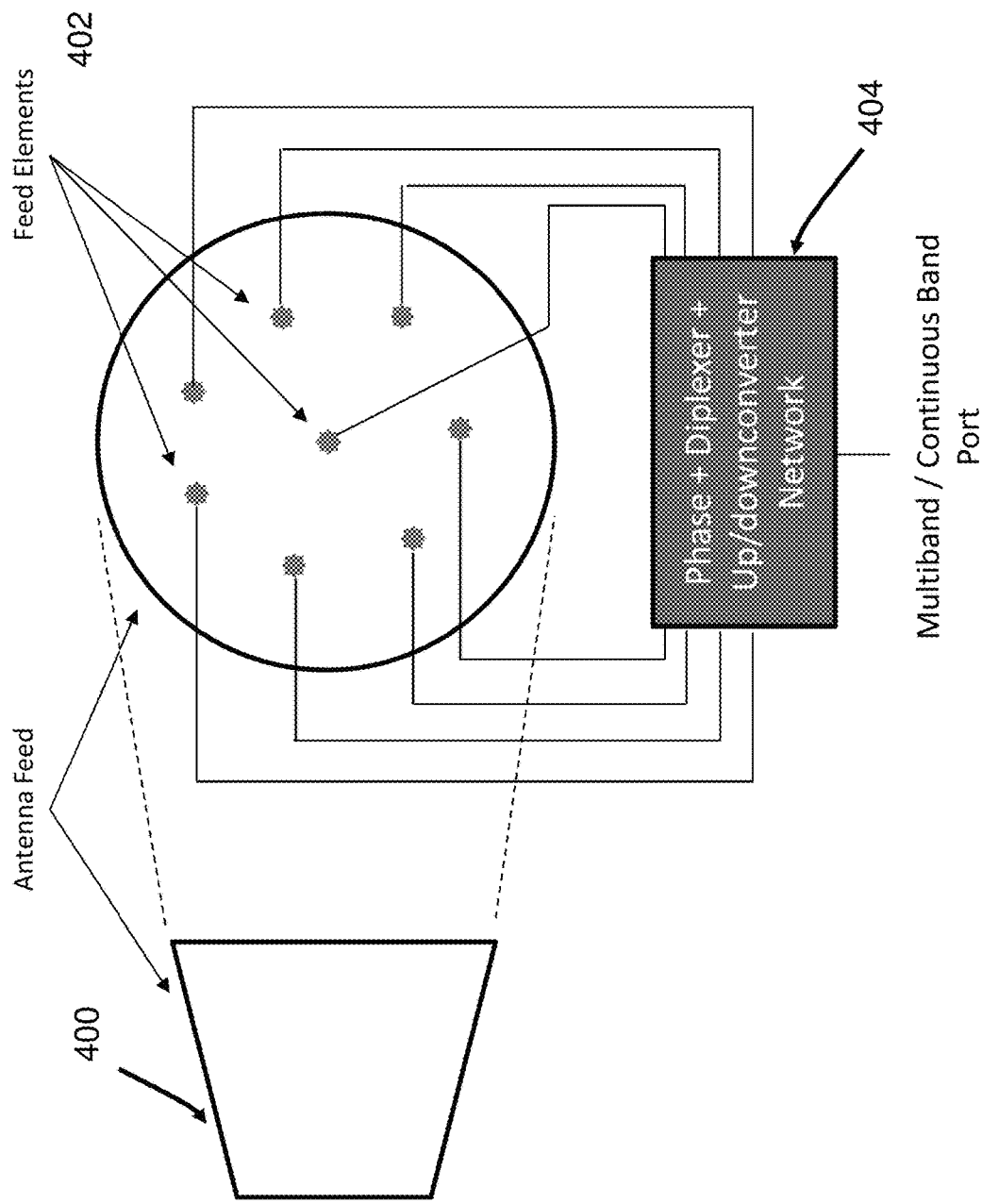
FIG. 4 shows an example of an antenna configuration in which multiple antenna elements are used for transmission using frequency stacking.

FIG. 4 shows an example of an antenna feed 400 in which multiple antenna elements 402 are used for transmission using frequency stacking. For example, frequency stacking may be achieved by generating a single wideband signal that includes signals in two or more separate frequency bands. Thus, a frequency stacking technique may use a same antenna port or antenna element, for transmitting signals in two different frequency bands. To support frequency stacking, e.g., allowing at least some antenna feed elements to transmit or receive signals in multiple frequency bands, the feeder network 404 may include a phase adjustment circuit, one or more diplexers and one or more up/down converters. The antenna configuration in FIG. 4 may be used to provide multi-band signals by simultaneously driving signals to (or from) the antenna elements.

Figure 5A:
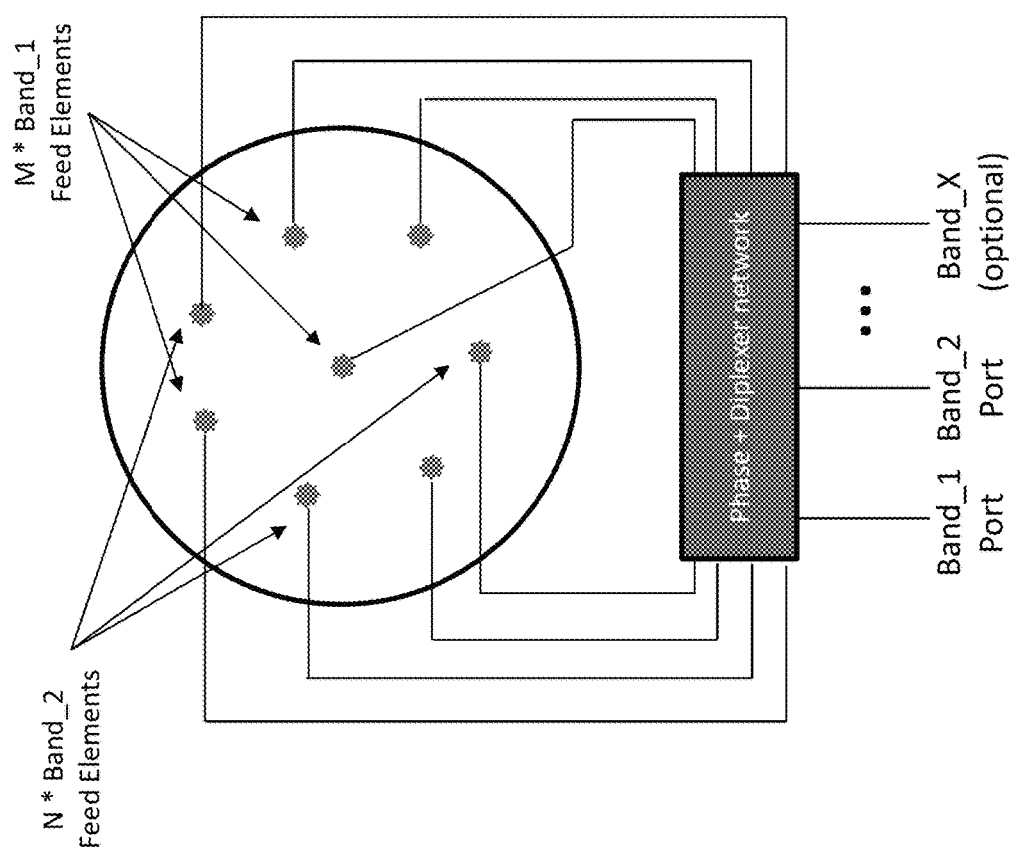
FIG. 5A shows an example of feed element configuration in an antenna configuration.

FIG. 5A shows an example of an antenna feed element configuration in an antenna feed. In general, the layout and number of antenna feed elements may depend on frequency band of operation and on the desired impact on the resulting beamwidths and beamshapes. Diplexers may be used when antenna feed elements have wider bandwidth sensitivity than individual antenna port frequency bands. In some embodiments, in place of the diplexer, a frequency selective combined phase network may be used.

In some embodiments, each antenna feed element may be dedicated to one frequency band, and in general, there may be more than one antenna feed element for any given band. For example, FIG. 5A depicts that N antenna elements are used for Band_2 communication and M antenna feed elements are used for Band_1 communication. Multiple antenna elements for a given frequency band may be driven to perform beam-combining as described in the present document.

FIG. 5B shows additional examples of possible embodiments of antenna feeds. As shown in example 550, an antenna feed may be operable in two frequency bands—a 3.5 GHz band being coupled with a phase network (PN) that operates at the 3.5 GHz band, and a second PN operating at the 5.8 GHz band. Each of these PNs may be independently connected with corresponding antenna elements via electrical connections, each connection carrying a band-specific signal, which is referred to as a narrowband signal (because it represents less than the entirety of bandwidth handled by the antenna feed).

In embodiment 552, some of the antenna feed elements are shown to be exclusively coupled with either the 3.5 GHz band PN or the 5.8 GHz band PN, thus operating in one frequency band only, while other antenna feed elements are shown to operate in a wideband configuration in which signals from multiple frequency bands are frequency stacked to provide (or receive) a wideband connection through a diplexer. Therefore, in general, an antenna feed may include antenna feed elements that may include a first group of dedicated, or narrowband, antenna elements, and a second, non-overlapping, group of antenna feed elements that operates as a wideband element that transmits/receives more than one bands of signals, and possibly all bands in which the antenna feed operates.

In embodiment 554, each antenna feed element is depicted to be operating as a wideband antenna feed element. Thus, in embodiment 554, duplexing for separation/combination of multiple frequency band signals is performed in the wideband phase network connected to each of the antenna feed elements.

The phase network may perform functions such as adjusting phases of the signals to be transmitted, or fed to each antenna element, to have the appropriate transmission phase so as to achieve a target area of coverage. The phase adjustment may take into account length of the signal path travelled by the signal from the PN circuit to the antenna element before being radiated from the antenna element. The phase adjustment may depend on the desired specific complex linear combination of signals radiated from the antenna elements (resulting possibly in an additive or subtractive effect on the magnitude of the signal), as is known in the art.

Figure 6:
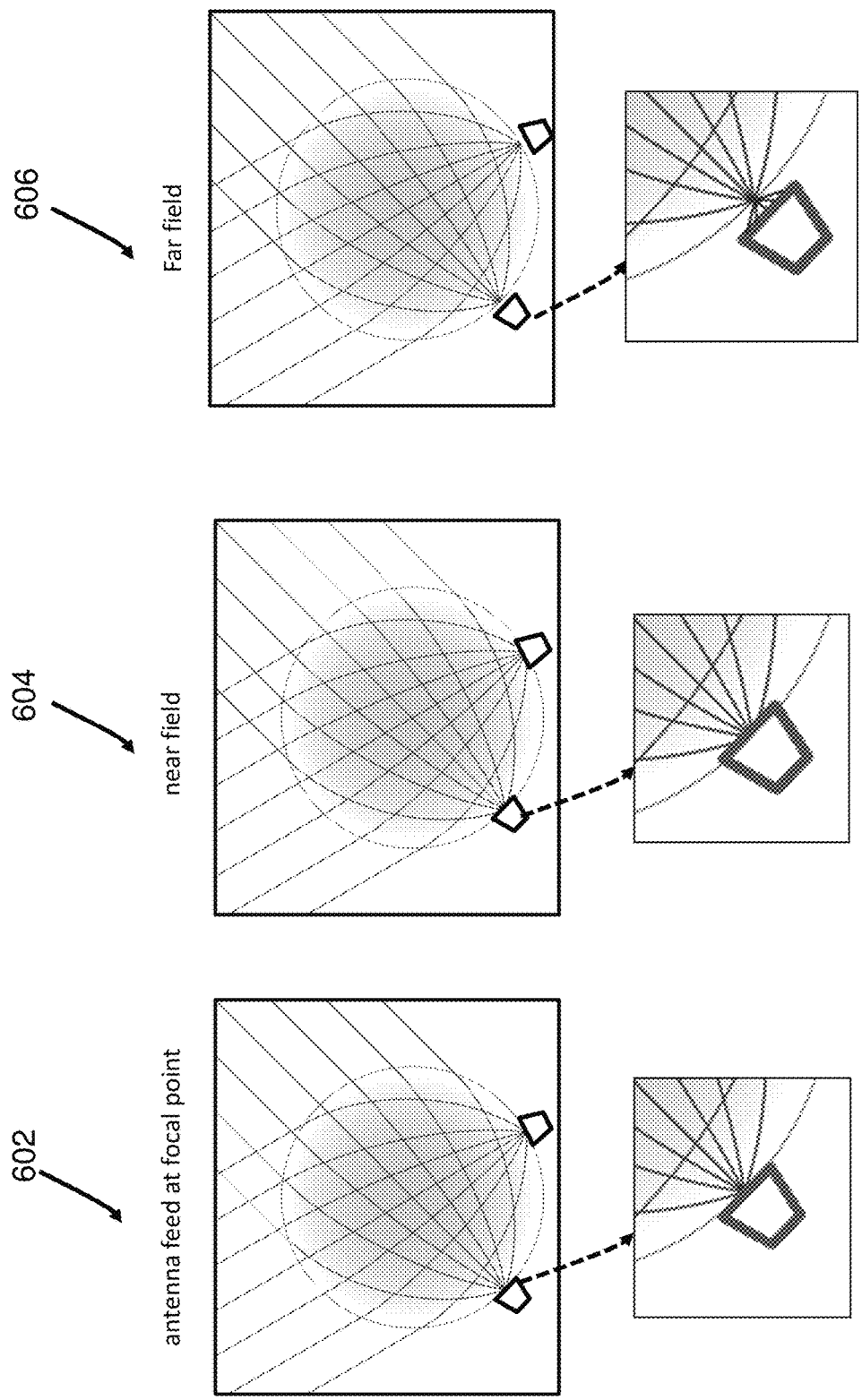
FIG. 6 illustrates different possible radial positioning of antenna elements.

FIG. 6 illustrates different possible radial positioning of antenna elements. In antenna 602, both the antenna feeds are positioned at the focal point of a lens antenna. In antenna 604, referred to as a "near field" arrangement, the antenna feed is positioned at an off-focal point, moved off the focal point in the direction of the signal lobe. In other words, the focal point of the lens may lie within the body of the antenna feed or behind it. Explaining in the following for the receive case, in this arrangement, the electromagnetic signal may impinging upon the antenna feed before the signal has converged to a focal point through the lens. In one advantageous aspect, when the antenna feed includes multiple antenna feed elements, e.g., as shown in FIG. 3, FIG. 4 or FIG. 5, each antenna feed element may receive (or transmit) a signal whose characteristics are similar to a signal received (or transmitted) by the other antenna feed elements.

In antenna 606, the antenna feed is off-focal point in a direction away from the lens or the direction of the signal beam. As a result, received signals may first converge at a focal point and then begin to diverge beyond the focal point prior to impinging on the surface of the antenna feed. Similar to the antenna 604, when multiple antenna feed elements are located on the surface of the antenna feed, in antenna 606, the multiple antenna feed elements may receive/transmit signals similar to each other in strength.

Figure 7:
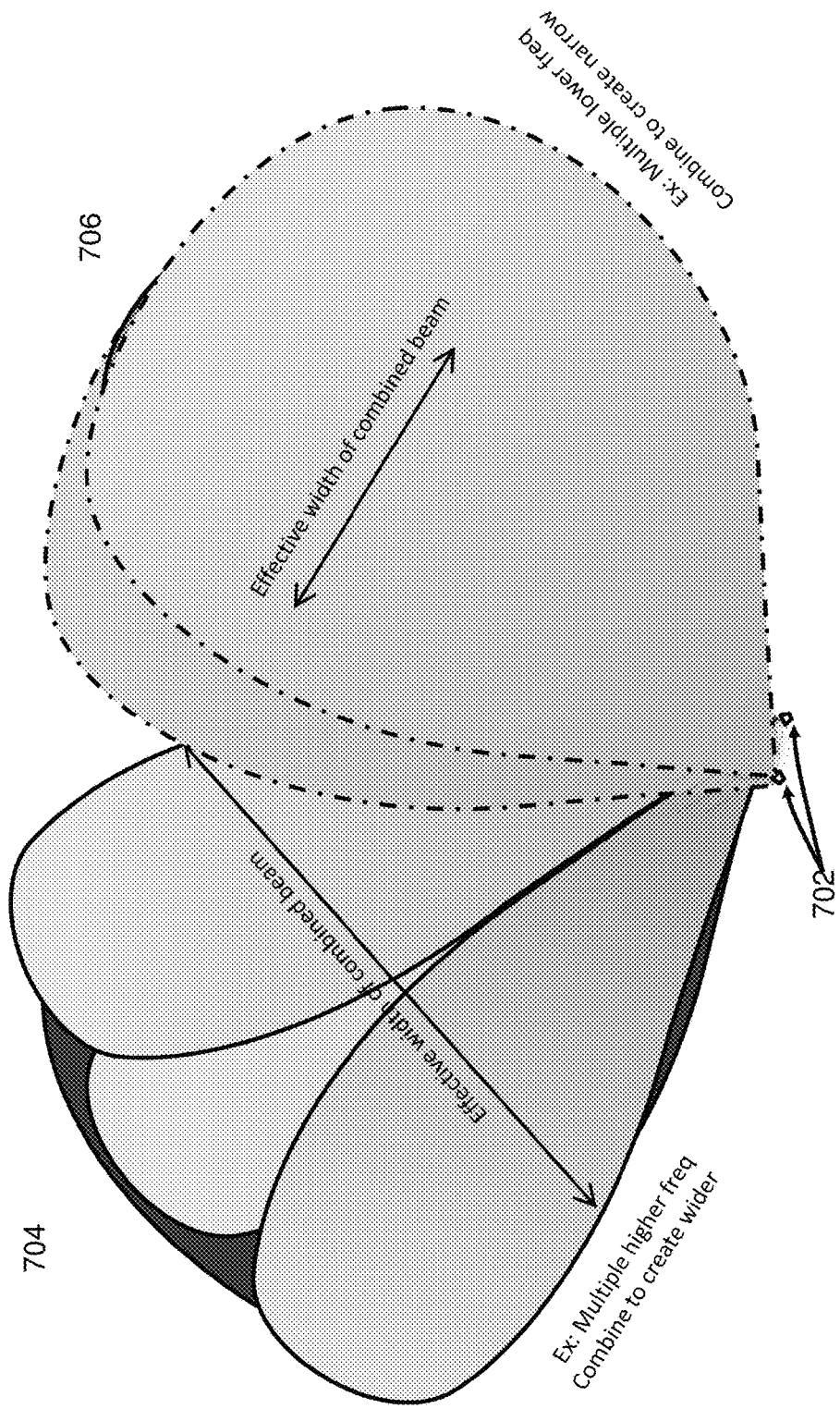
FIG. 7 depicts examples of beamforming to achieve a wider and a narrower beamwidth pattern.

FIG. 7 depicts examples of beamforming to achieve a wider and a narrower beamwidth pattern. A Luneberg lens is used for illustration, but other similar lenses could also be used (e.g., a Rotman lens). The variable beamwidth Luneburg lens antenna illustrates how various antenna feed configurations may be used to increase or reduce the effective bandwidth of a combined beam emanating from/received by the antenna feed with multiple antenna feed elements, as descried with respect to FIGS. 3 to 6. In the beam pattern 704, the effective width of the combined beam is wider than each individual beam to or from an antenna feed. For example, in a multi-band antenna operation, the beam pattern 704 may represent one of the bands (e.g., the higher frequency band) that is serviced by the antenna. In the beam pattern 706, antenna elements and signal processing may be arranged to provide an effective beam width that is narrower than the individual beams from antenna elements (e.g., the same antenna elements that are also operating in a different frequency band).

The embodiment also provides a frequency matched beamwidth. One desirable configuration may provide the same effective azimuthal beam width between different frequency bands. The constructive and/or destructive interference patterns from the various antenna elements of the same frequency band shape the effective beam width to match that of the other band(s). In a variation, the antenna may be operated to provide different beam widths for different frequency bands. The beamwidth variations may be achieved by constructive or destructive signal interference, and/or by using off-focal point antenna placement.

Figure 8:
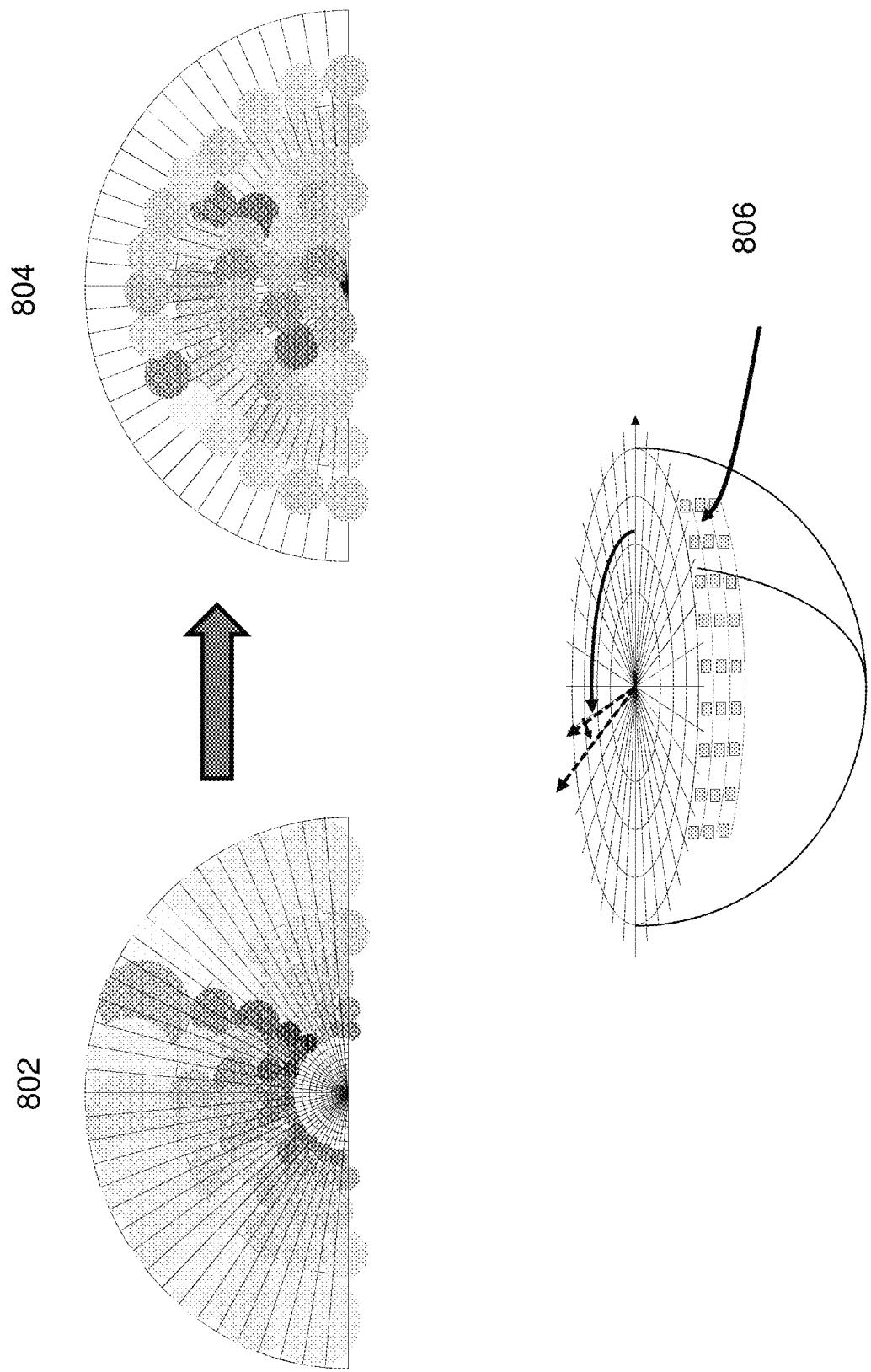
FIG. 8 shows an example of a variable beamwidth antenna and a corresponding example radiation pattern.

FIG. 8 shows an example of a variable beamwidth antenna and a corresponding examples of radiation patterns. One example configuration may provide a same effective area coverage yet different beam elevation angles. The multiple antenna feeds may be tiled in an array along the azimuth and the elevation directions, as shown in the arrayed arrangement 806. Antenna feeds creating beams pointed towards areas that are close to the base station have multiple elements whose signals are combined to a create wider beam. Conversely, for further points signals at the elements are combined to create a narrower beam, such that the actual coverage is approximately the same as that for the "near" beam described previously. It will be appreciated that the disclosed embodiments can thus be used to provide uniform density coverage (configuration 804) from each antenna feed to a geographic area, irrespective of the distance of the coverage area from a transmission station at which the antenna is installed for operation. One example advantageous property is that this configuration overcomes operational problems associated with the coverage footprint depicted in configuration 802, in which the zone or area of the covered area increases at distances farther away from the antenna location. For example, at the transmission station at which such an antenna is installed, network backhaul resources can be uniformly allocated to each antenna element due to its uniform density coverage, instead of having to allocate non-uniform transmission resources based on the size of the covered area.

In some embodiments, an antenna system includes an antenna lens such as a Luneburg lens or a Rotman lens and one or more antenna feeds placed at on or off focal point of the antenna lens (e.g., as depicted in FIG. 6). The position of the antenna feed may thus be far-field (behind focal point) or near-field (in front of the focal point, in the direction of beam). Each of the one or more antenna feeds comprises one or more antenna feed elements that are electrically independently operable. The antenna system also includes an antenna feed network, or a phase network (PN) electrically coupled with the one or more antenna feed elements via signal paths. In some embodiments, each of the antenna feeds is designated to operate in one or more frequency bands and wherein position and/or size of the one or more antenna feed elements for each antenna feed depends on the one or more frequency bands of operation. In some embodiments, at least one antenna feed is capable of simultaneous operation in at least two frequency bands and wherein the at least one antenna feed includes multiple antenna elements that are grouped to operate in different ones of the at least two frequency bands.

In some embodiments, at least one antenna feed is capable of simultaneous operation in at least two frequency bands and wherein at least one antenna feed includes an antenna feed element that is coupled to the antenna feed network using a frequency stacked configuration in which the antenna feed element simultaneously receives or transmits signals in two different frequency bands and wherein the antenna feed network includes a diplexer.

In some embodiments, the antenna system includes a data feed that is positioned conformal to the antenna lens. For example, as depicted in FIG. 8, an array of antennas may be placed around the spherical lens surface.

Figure 9:
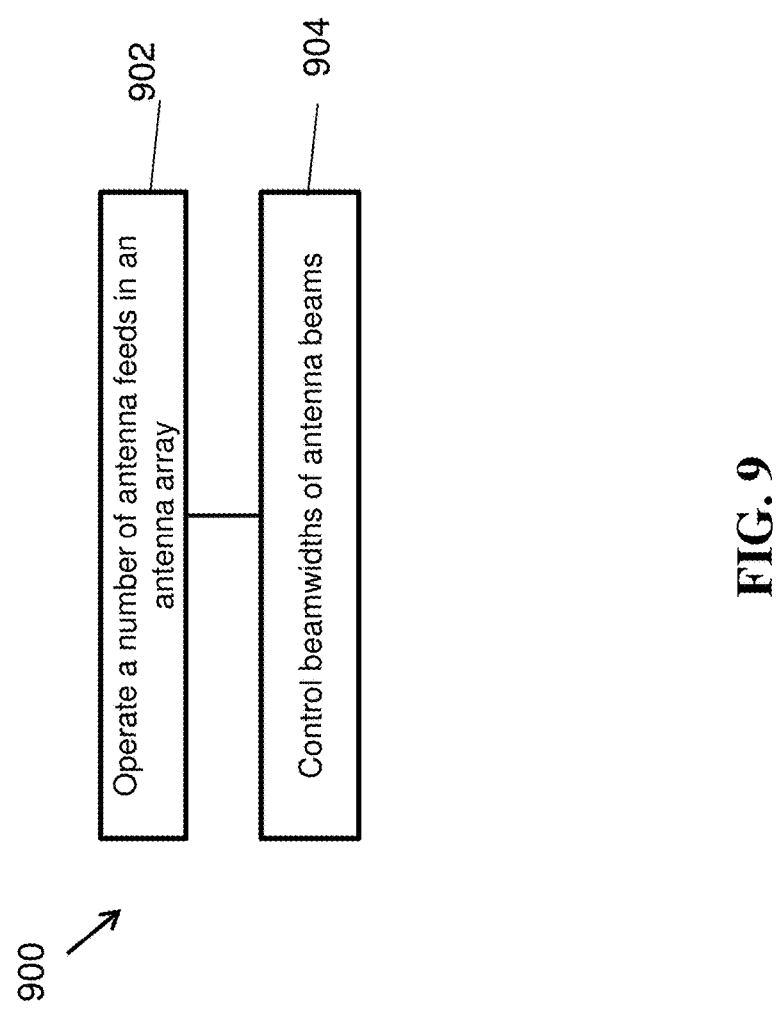
FIG. 9 is a flowchart for an example method of wireless communication.

FIG. 9 is a flowchart for an example method 900 of wireless communication. The method 900 may be implemented by a wireless communication apparatus such as an access point or a base station that services multiple user devices to provide wireless data connectivity.

The method 900 includes operating (902) a wireless transmission station to provide wireless signal coverage to a geographical region includes arranging a number of antenna feeds in an antenna array on or near surface of a Luneburg lens, the antenna array extending along an azimuth axis and an elevation axis, operating the number of antenna feeds for transmission and reception of signals, each antenna feed comprising multiple antenna elements, wherein each antenna element is sensitive to a pre-determined range of frequencies, and adjusting beamwidths of antenna beams using two or more antennas for signal transmission such that an equal-density signal coverage is provided to geographic areas irrespective of their distance from the wireless transmission station.

The method may include controlling (904) phases of signals fed to the multiple antenna feed elements to cause an additive or subtractive effect, thereby resulting in a beam with a greater or smaller beamwidth. In various embodiments, the antenna elements may be positioned at on-focal or off-focal point of the antenna lens. In some embodiments, the method 900 may be used for transmission and reception of signals in multiple non-overlapping frequency bands. Some examples are described with respect to FIG. 7. For example, in some configurations, the multiple non-overlapping frequency bands include a low frequency band and a high frequency band, and wherein beamwidths of the low frequency band and the high frequency band are separately controlled. In some embodiments, beamwidths of the low and high frequency bands may be different from each other, e.g., as depicted in FIG. 7.

Figure 10:
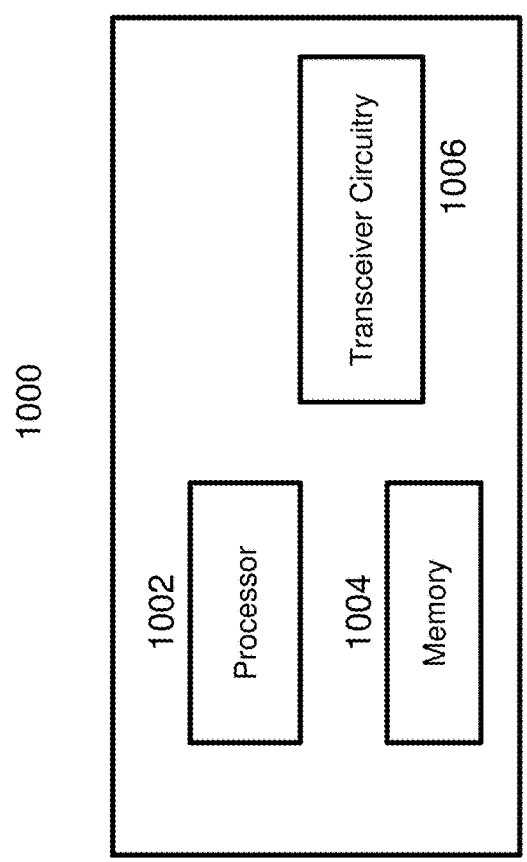
FIG. 10 is a block diagram for an example wireless communication apparatus.

FIG. 10 is a block diagram for an example wireless communication apparatus 1000 that may use the antenna system embodiments described herein to perform wireless data transmission and reception. The apparatus 1000 may include a processor 1002, a memory 1004 that stores processor-executable instructions and data during computations performed by the processor. The apparatus 1000 includes reception and/or transmission circuitry 1006, e.g., including radio frequency operations for receiving or transmitting signal and/or receiving data or information bits for transmission over a wireless network. The circuitry may include, for example, the phase network described with respect to FIGS. 3, 4, 5A and 5B.

It will be appreciated that the disclosed techniques can be used for implementing high bandwidth and uniform coverage fixed wireless access systems.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An antenna system, comprising:
   an antenna lens;
   one or more antenna feeds placed at an off-focal point of the antenna lens that is off a focal point along a direction of a signal beam of the antenna system;
   wherein each of the one or more antenna feeds comprises one or more antenna feed elements that are electrically independently operable; and
   an antenna feed network electrically coupled with the one or more antenna feed elements via signal paths.

2. The antenna system of claim 1, wherein each of the antenna feed is designated to operate in one or more frequency bands and wherein position and/or size of the one or more antenna feed elements for each antenna feed depend on the one or more frequency bands of operation.

3. The antenna system of claim 1, wherein at least one antenna feed is capable of simultaneous operation in at least two frequency bands and wherein the at least one antenna feed includes multiple antenna elements that are grouped to operate in different ones of the at least two frequency bands.

4. The antenna system of claim 1, wherein at least one antenna feed is capable of simultaneous operation in at least two frequency bands and wherein the at least one antenna feed includes an antenna feed element that is coupled to the antenna feed network using a frequency stacked configuration in which the antenna feed element simultaneously receives or transmits signals in two different frequency bands and wherein the antenna feed network includes a diplexer.

5. The antenna system of claim 1, wherein the off-focal point is a near-field point that is in front of the focal point in the direction of the signal beam.

6. The antenna system of claim 1, wherein the off-focal point is a far-field point that is behind the focal point.

7. The antenna system of claim 1, further including an antenna feed that is positioned conformal to the antenna lens.

8. A method of operating a wireless transmission station to provide wireless signal coverage to a geographical region, comprising:
   operating a number of antenna feeds for transmission and reception of signals, each antenna feed comprising multiple antenna elements, wherein each antenna element is sensitive to a pre-determined range of frequencies, and wherein the antenna feeds are arranged in an antenna array on or near surface of a lens antenna, the antenna array extending along an azimuth axis and an elevation axis; and
   controlling beamwidths of antenna beams using two or more antennas for signal transmission causing a beam pointed towards an area closer to the wireless transmission station to be wider compared to a beam pointed towards an area further away from the wireless transmission station, such that an equal-density signal coverage is provided to geographic areas irrespective of their distance from the wireless transmission station.

9. The method of claim 8, wherein at least some antennas in the antenna array comprise multiple antenna feed elements, and wherein the method further includes:
   adjusting phases of signals fed to the multiple antenna feed elements to cause an additive or subtractive effect on the signal magnitude, thereby resulting in a beam with a greater or smaller beamwidth.

10. The method of claim 9, further including positioning the multiple antenna feed elements at an on-focal or off-focal point of the antenna.

11. The method of claim 9, wherein the transmission and reception of signals includes transmission and reception of signals in multiple non-overlapping frequency bands.

12. The method of claim 11, wherein the multiple non-overlapping frequency bands include a low frequency band and a high frequency band, and wherein beamwidths of the low frequency band and the high frequency band are separately controlled.

13. The method of claim 11, wherein the beamwidths of the low frequency band and the high frequency band are different from each other.

* * * * *